(12) United States Patent
Singh et al.

(10) Patent No.: US 8,650,693 B2
(45) Date of Patent: Feb. 18, 2014

(54) SUN TRACKING MECHANISM WITH AUTOMATED CLEANING ARRANGEMENT FOR SOLAR PANEL

(75) Inventors: Solanki Chetan Singh, Maharashtra (IN); Tejwani Ravi, Maharashtra (IN)

(73) Assignee: Indian Institute of Technology, Bombay, Powai, Mumbai, Maharashtra (IN)

( * ) Notice: Subject to any disclaimer, the term of this patent is extended or adjusted under 35 U.S.C. 154(b) by 0 days.

(21) Appl. No.: 13/518,910

(22) PCT Filed: Jun. 21, 2011

(86) PCT No.: PCT/IN2011/000419
§ 371 (c)(1),
(2), (4) Date: Jun. 25, 2012

(87) PCT Pub. No.: WO2011/161696
PCT Pub. Date: Dec. 29, 2011

(65) Prior Publication Data
US 2013/0086761 A1    Apr. 11, 2013

(30) Foreign Application Priority Data

Jun. 21, 2010   (IN) .......................... 1838/MUM/2010

(51) Int. Cl.
*B08B 11/00*        (2006.01)
(52) U.S. Cl.
USPC ................................. 15/77; 15/21.1
(58) Field of Classification Search
USPC .............................. 15/21.1, 246, 77
See application file for complete search history.

(56) References Cited

U.S. PATENT DOCUMENTS

| | | | |
|---|---|---|---|
| 4,275,711 A | 6/1981 | Dumbeck | |
| 2005/0284468 A1 | 12/2005 | Pawlenko et al. | |
| 2009/0266353 A1 | 10/2009 | Lee | |
| 2010/0147286 A1 | 6/2010 | Xiang et al. | |
| 2010/0293729 A1 * | 11/2010 | Lee | 15/21.1 |
| 2011/0308545 A1 * | 12/2011 | Luechinger et al. | 134/6 |

* cited by examiner

*Primary Examiner* — Randall Chin
(74) *Attorney, Agent, or Firm* — Morris Manning & Martin LLP; Tim Tingkang Xia, Esq.

(57) ABSTRACT

A solar panel includes a cleaning assembly, the solar panel being mounted for rotation about a horizontal axis along a semi-circular path and the cleaning assembly comprising an oblong brush held across the front face of the solar panel and slidable back and forth along the front face of the solar panel.

5 Claims, 7 Drawing Sheets

SUN TRACKING MECHANISM WITH AUTOMATED CLEANING ARRANGEMENT FOR SOLAR PANEL

FIELD OF THE INVENTION

The present invention relates to sun tracking mechanisms and self cleaning solar panel used within the sun tracking mechanisms.

DESCRIPTION OF THE BACKGROUND ART

In the era of clean/green technologies, consistent efforts are being made to increase power output from the solar PV modules that are now widely used across countries to generate clean electrical power. In order to improve the power output from the solar PV modules, a sun tracking system is generally implemented. Such sun tracking systems use sensors that track sun rays falling from the sun on the solar PV panels. These sensors allow exact determination of the position of the sun so that the sun rays incident on the solar panel strikes in perpendicular orientation to ensure maximum utilization of solar energy for electricity generation.

However, due to the environmental conditions in which the solar PV modules are installed, like tropical climate around the equator, significant amount of dust gets deposited on PV modules. The dust gets accumulated on the front surface of the module and blocks the incident light from the sun and hence reduces the power generation capacity of module. The power output reduces as much as by 50% if the module is not cleaned even for a month. This is a major problem with such systems that needs to be rectified on an urgent priority in order to save the lost power. Another limitation that such sun tracking systems face is with the sensors that are required for the exact determination of the position of the sun. These sensors sometime creates problem in situation like in the cloudy season they won't be able to track the exact position of sun. As a result of this, sun rays may not fall on the solar PV panels perpendicularly and energy conversion will not be efficient.

There are not many systems available that can effectively track the sun so that solar rays are incident perpendicularly on the solar PV panels and therefore, progress to counter this drawback is not been made at a fast pace. However, an obvious solution to the dust problem is that one should appoint someone who cleans the panels and sensors on a regular basis so that we can have maximum conversion of energy. The other solution is that we should install some tracking system which should be able to clean the panels automatically without any human interface. However, this would require additional electronics and motor arrangement to be implemented so as to clean the panel and sensors in which will add extra cost and power to the system.

Thus, there is a need to device a sun tracking system that address the above problems and yet provide a good power output from such sun tracking systems.

SUMMARY OF THE INVENTION

Disclosed herein is a solar panel that includes a cleaning assembly, the solar panel being mounted for rotation about a horizontal axis along a semi-circular path and the cleaning assembly comprising an oblong brush held across the front face of the solar panel and slidable back and forth along the front face of the solar panel.

In some embodiments, the solar panel has a solar energy exposed surface and a pair of opposite channels disposed adjacent to the solar energy exposed surface.

In some embodiments, the cleaning assembly includes a pair of guide wheels disposed at its two ends, each of the guide wheels movably engaging a corresponding channel on the solar panel so as to allow the cleaning assembly to slidably move back and forth across the solar energy exposed surface.

In some embodiments, each of the guide wheels of the cleaning assembly freely slides under gravity within the corresponding channel provided on the solar panel when the solar panel rotates along the semi-circular path.

In some embodiments, the solar panel is capable of describing a circular path about the horizontal axis, the cleaning assembly slidably moving forward from the first secured position to the second secured position when the solar panel describes a first semi-circular path and whereas, the cleaning assembly moves backward towards the first secured position when the solar panel describes a second semi-circular path.

According to another aspect of the present invention, a sun tracking mechanism for a solar panel, the mechanism includes a stepper motor having its shaft connected to an input shaft of a speed reduction gear box, the output shaft of the gear box being connected to a horizontal shaft disposed for rotation about a horizontal axis, the solar panel being mounted on the horizontal shaft across the width of the solar panel and at the centre of the solar panel and a control circuit for driving the motor, wherein the control circuit is programmed to rotate the stepper motor and the horizontal shaft by 15° at intervals of 60 minutes.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention and are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

A BRIEF DESCRIPTION OF THE DRAWINGS

The above-mentioned and other features and advantages of the various embodiments of the invention, and the manner of attaining them, will become more apparent will be better understood by reference to the accompanying drawings, wherein.

DETAILED DESCRIPTION OF THE PREFERRED EMBODIMENTS

Figure 1:
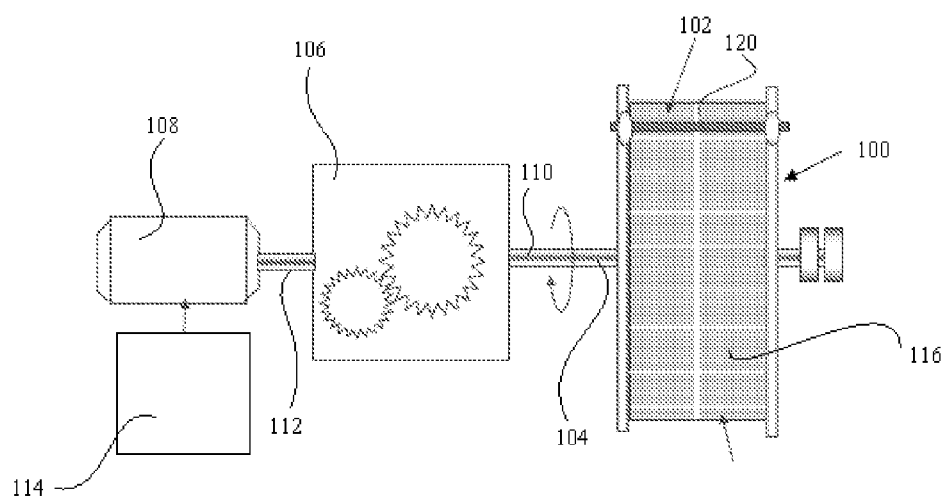
FIG. 1 illustrates a schematic view of a sun tracking mechanism having a claiming assembly engaging a solar panel according to an embodiment of the present invention.

FIG. 1 shows a sun tracking mechanism according to an embodiment of the present invention. The sun tracking mechanism includes a solar panel 100 having a cleaning assembly 102 mounted thereto and movable against a top surface of the solar panel 100 (described in detail in the foregoing description). The solar panel 100 is rotatably mounted over a horizontal shaft 104 that rotates along a horizontal axis. A back portion (not shown) of the solar panel 100 is rotatably mounted on the horizontal shaft 104. Preferably, a central portion of the back portion of the solar panel 100 rotatably engages the horizontal shaft 104. The solar panel 100 along with the horizontal shaft 104 may be mounted on a supporting surface (not shown) that is elevated from the ground so that the solar panel 100 has sufficient room to rotate.

Further, as shown in FIG. 1, the solar panel 100 is operably engaged with a gear box 106 and a stepper motor 108. The horizontal shaft 104 having the solar panel 100 rotatably engaged thereto is rotatably connected to an output shaft 110 of the gear box 106. An input shaft 112 of the gear box 106 is connected to a stepper motor 108 that provides the necessary drive to the horizontal shaft 104 for rotating the solar panel 100. Preferably, the gear box 106 is a speed reduction gear box 106 used for controlling the rotation of the horizontal shaft 104 along its horizontal axis with much accuracy.

An electronic control circuit, which is preferably a microcontroller 114, is connected with the stepper motor 108 that allows control based operation of the stepper motor 108. In one embodiment of the present invention, the microcontroller 114 is preprogrammed based on the rotation of earth along its rotational axis. It is well known that the earth while rotating along its axis completes one rotation in 24 hours. Accordingly, the microcontroller 114 is also preprogrammed to complete one full rotation in 24 hours by corresponding the solar panel 100 and its horizontal axis with the earth and its rotational axis. This allows the solar panel 100 to rotate simulating the axial rotational motion of earth with the sun as its focus.

This preprogrammed microcontroller 114 connected with the stepper motor 108 drives the stepper motor 108 to rotate selectively and eventually, allows the horizontal shaft 104 to selectively rotate. For example, the stepper motor 108 allows the horizontal shaft 104 to rotate by 15° at intervals of 60 minutes (or by 0.25° at interval of 1 minute). Thus, a skilled person in the art will recognize that the solar panel 100, which is rotatably connected with the horizontal shaft 104, will also turn by 15° at intervals of 60 minutes (or by 0.25° at interval of 1 minute). Accordingly, at the end of 12 hours the solar panel 100 would be turned by 180° or in other words at the end of 24 hours, the solar panel 100 would be turned upside down by 360°. Further, as shown in FIGS. 4-10, the solar panel 100 when rotating also describes a circular path. For the first 12 hours of rotation (i.e. rotation by 180°) the solar panel 100 describes a first semi-circular path whereas, for the next 12 hours of rotation (i.e., total rotation by 360°) the solar panel 100 describes a second semi-circular or, the solar panel 100 completes one full circle with the solar panel 100 turned upside down and again back to its starting orientation.

Further, the solar panel 100 is initially positioned in such a manner that the solar panel 100 is in vertical orientation and faces east side, in morning, at about 6:00 am approximately. Once the solar panel 100 has completed half of its rotation, i.e., turned by 180°, the solar panel 100 is again positioned in a vertical orientation but facing the west side, during evening. For the next 180° rotation of the solar panel 100 so as to complete one full rotation, the solar panel 100 rotates during night time so as to allow the solar panel 100 to reach to its previous initial vertically oriented position at 6:00 am approximately. This allows the solar panel 100 to be ready for receiving the sun rays perpendicularly thereupon for the subsequent day sunrise. Furthermore, as described in detail in the foregoing description, preprogramming of the stepper motor 108 and the rotational correspondence of the solar panel 100 with the earth allows the solar panel 100 to avail the sun rays incident thereupon from morning to evening, i.e., till the time sunlight is available.

The various embodiments of this invention offer the user with two folds flexibility. First, once the solar panel 100 has fully rotated by 360°, the solar panel 100 reaches to its initial previous position automatically. Second, the user may also bring the solar panel 100 back to its initial starting position after the solar panel 100 has rotated by 180° in order to save power consumed by the stepper motor 108 and the gear box 106. In order to do so all the user needs to do is to turn off the power supply to the stepper motor 108 and manually rotate the solar panel 100 to its initial position.

Figure 2:
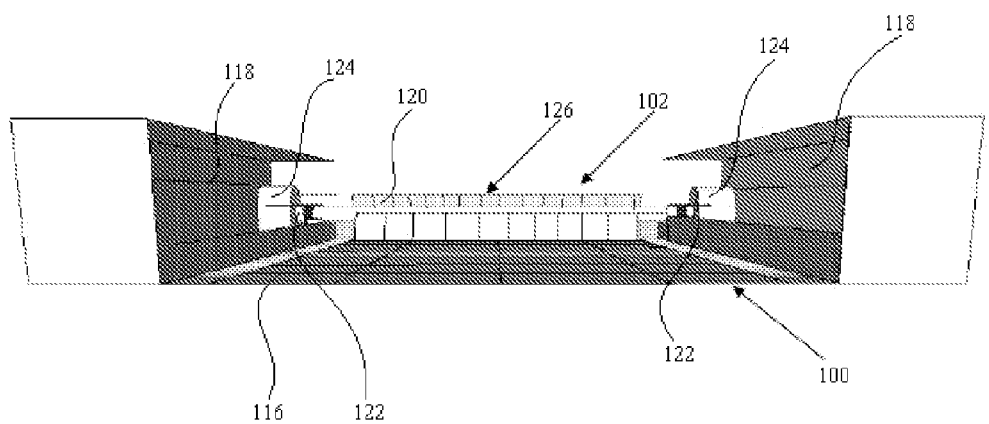
FIG. 2 is an elevational view of the solar panel and the cleaning assembly of FIG. 1.
Figure 3:
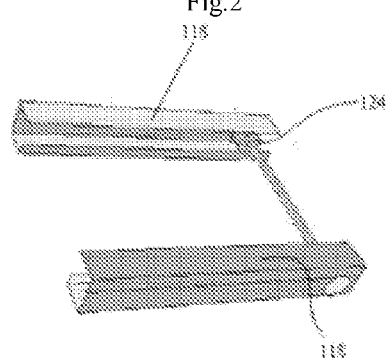
FIG. 3 is a partial view of the cleaning assembly and the solar panel of FIG. 2 according to an embodiment of the present invention.

Reference will now be given to FIGS. 2 and 3 that show arrangement between the solar panel 100 and the cleaning assembly 102, according to one embodiment of the present invention. The cleaning assembly 102 is mounted on the solar panel 100 that is operatively connected with the stepper motor 108 and gear box 106 arrangement described in above embodiments. As shown in FIG. 2, the solar panel 100 has a solar energy exposed surface (front face) 116 and a pair of opposite channels 118 disposed adjacent to the solar energy exposed surface 116. The cleaning assembly 102 includes an oblong brush 120 extending between its two ends 122. The cleaning assembly 102 further includes a pair of guide wheels 124 disposed at its two ends 122. Each of the guide wheels 124 is movably engaged with a corresponding channel 118 on the solar panel 100 and slide back and forth under the influence of gravity when the solar panel 100 describes a semi-circular or a circular path, as noted above.

As seen in FIG. 2, the cleaning assembly 102 is positioned in its first secured position 126 and in such a manner that the oblong brush 120 is held across a width of the solar energy exposed surface 116 of the solar panel 100. The oblong brush 120 makes physical contact with the solar energy exposed surface 116 in the first secured position 126. Further, as the solar panel 100 describes the semi-circular or circular path, the claiming assembly slides within the channels 118 of the solar panel 100 to reach to a second secured position 128. As the oblong brush 120 makes physical contact with the solar energy exposed surface 116, the oblong brush 120 sweeps across the solar energy exposed surface 116 due to this sliding action of the cleaning assembly 102. This sweeping allows removal of any dust that may be present on the solar energy exposed surface 116. Thus, it would be apparent to a person skilled in the art the solar energy exposed surface 116 is automatically cleaned, without any manual intervention, whenever the cleaning assembly 102 moves across the solar panel 100.

Reference will now be given to FIGS. 4-10 that describe cleaning operation of the cleaning assembly 102 with respect to the rotating solar panel 100, which is connected to the stepper motor 108 and the speed reduction gear box 106.

Figure 4:
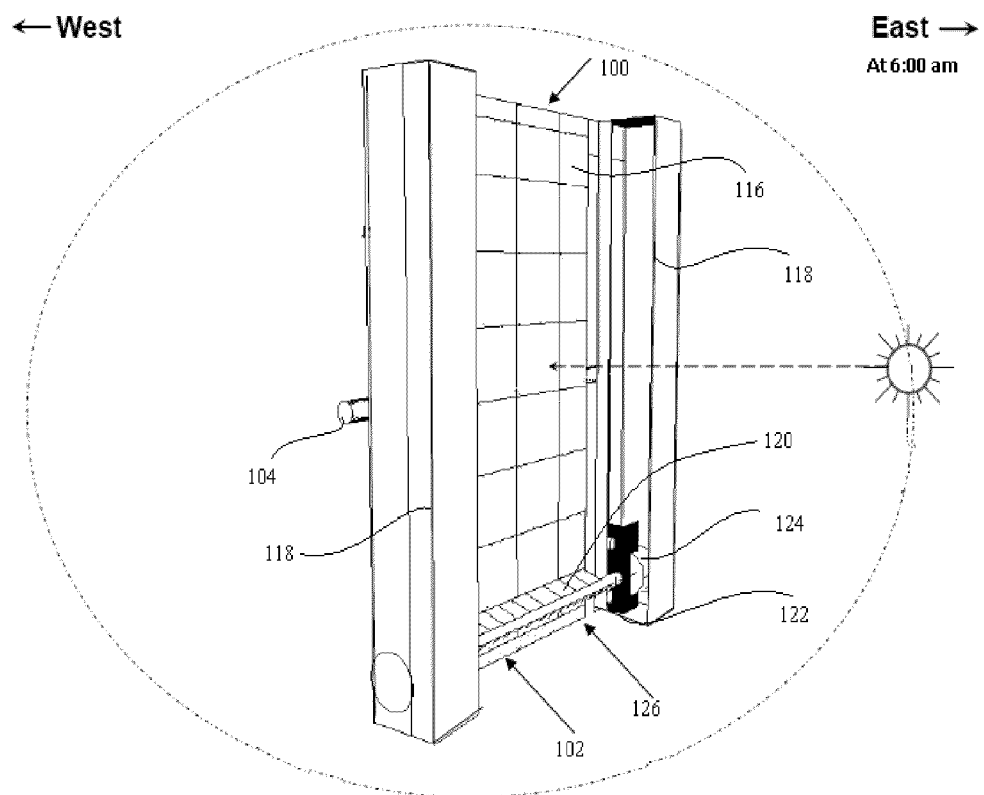
FIG. 4 shows position of the cleaning assembly on the solar panel of FIG. 1 and the position of the solar panel with respect to the sun at 6:00 am.

As shown in FIG. 4, the solar panel 100 is initially positioned to face the sun facing east side with the solar panel 100 is nearly vertically oriented so that the solar energy exposed surface 116 faces the sun. Generally, the sun appears in the sky sometime in between 5:30 am to 6:00 am. Assuming that the first sun rays are incident on the solar energy exposed surface 116 at around 6:00 am, the solar panel 100 is disposed to face the east side, towards the sun, in vertical orientation at this time. Accordingly, the stepper motor 108 operating in electronic communication with the preprogrammed electronic controller is turned on allowing the solar panel 100 to rotate in simulation with the rotation of the earth. As shown in FIG. 4, the solar rays are incident on the solar energy exposed surface 116 in nearly perpendicular orientation. As generally known, most of the solar rays falling in such perpendicular orientation will penetrate the solar energy exposed surface 116 thereby allowing efficient utilization of most of the solar energy falling thereon. Further, in this vertically oriented position of the solar panel 100, the cleaning assembly 102 that is freely movable within the channel 118 of the solar panel 100 is disposed in its first secured position 126. Clearly, in the first secured position 126, the cleaning assembly 102 is acted upon by the gravitational force and allows the cleaning assembly 102 to remain in this position.

Figure 5:
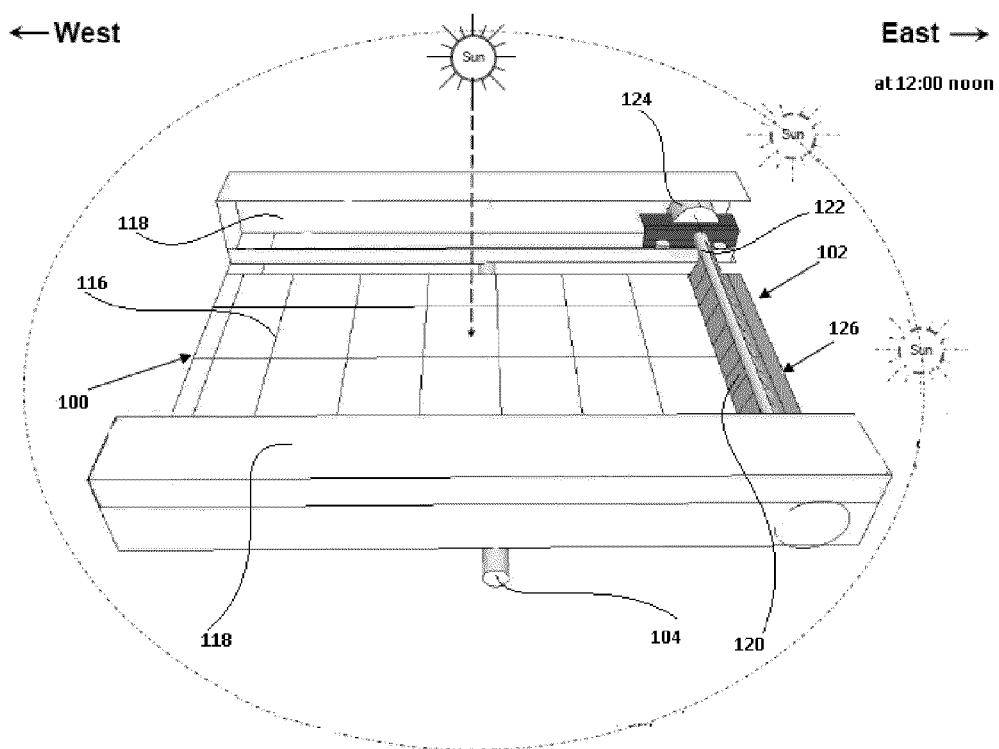
FIG. 5 shows position of the solar panel with respect to the sun of FIG. 4 at 12:00 pm.

As day passes, position of the sun changes due to rotation of the earth on its own axis. The path followed by the sun due to this change in position of the sun is generally ellipse in nature, as shown in FIG. 5. Further, due to the fact that the microcontroller 114 is preprogrammed as noted above, the solar panel 100 starts rotating along the horizontal axis in accordance with the change in position of the sun. Due to this rotation of the solar panel 100, which started from 6:00 am in the morning, the solar panel 100 maps the sun in its path/orbit in such a manner that the incident solar rays from the sun is always incident perpendicularly on the solar energy exposed surface 116 of the solar panel 100. Rotational position of the solar panel 100 at 12:00 noon is shown in FIG. 5. It is also evident from FIG. 5 that the cleaning assembly 102, which is disposed in the first secured position 126 on one end of the solar panel 100 and acted upon by the gravitational force, stills remains in the first secured position 126.

Figure 6:
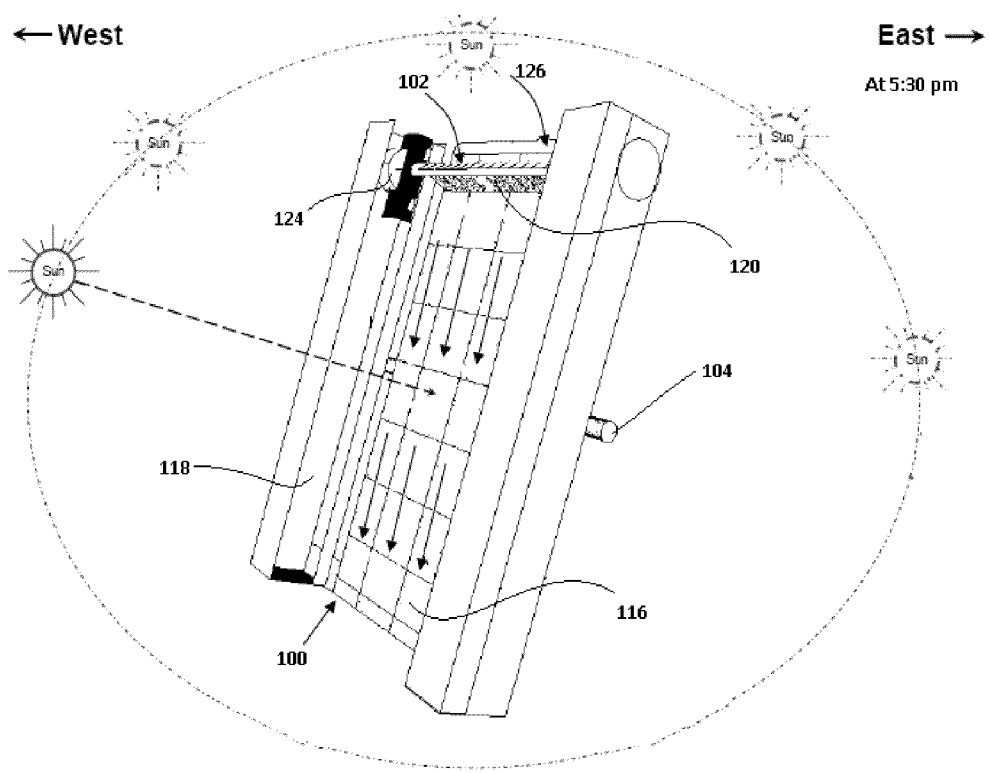
FIG. 6 shows position of the cleaning assembly on the solar panel of FIG. 5 and the position of the solar panel with respect to the sun at 5:30 pm.

FIG. 6 shows the position of the solar panel 100 and the position of the cleaning assembly 102 on the solar panel 100 at 5:30 pm in the evening. At this point of time the solar panel 100 faces the sun on west side with the solar energy exposed surface 116 receiving the incident solar rays in nearly perpendicular orientation. Further, around this time the solar panel 100 is in a tilted position with the cleaning assembly 102 acted upon by the gravitational force. In this position the cleaning assembly 102 is positioned in such a manner that even a slight push to the cleaning assembly 102 will allow the cleaning assembly 102 to slide downwards under the gravitational force towards the other end of the solar panel 100. The arrows indicate that the cleaning assembly 102 is just about to slide down under the gravitational force upon further rotation of the solar panel 100.

Figure 7:
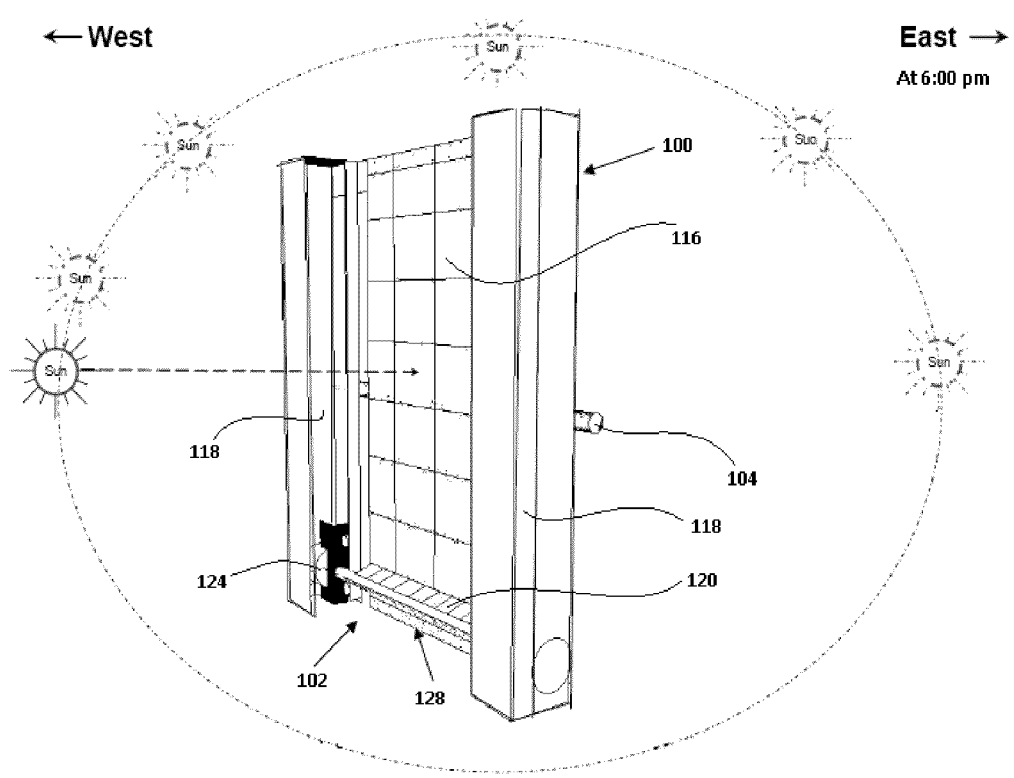
FIG. 7 shows position of the cleaning assembly on the solar panel of FIG. 6 and the position of the solar panel with respect to the sun at 6:00 pm.

FIG. 7 indicates the position of the solar panel 100 and the cleaning assembly 102 on the solar panel 100 at approximately 6:00 pm. The solar panel 100 is nearly vertically orientated at this point of time and the cleaning assembly 102 has reached to down to the other end of the solar panel 100. At this position the cleaning assembly 102 is disposed in a second secured position 128. From the previous position of the cleaning assembly 102 as described above, the cleaning assembly 102 receives the necessary downward push due to further rotation of the solar panel 100 in accordance with the preprogrammed microcontroller 114. This push allows the guide wheels 124 of the cleaning assembly 102 to freely slide within the corresponding channels 118 and reach to the second secured position 128. The sliding movement of the cleaning brush allows the oblong brush 120, which makes physical contact with the solar energy exposed surface 116, to sweep the entire solar energy exposed surface 116 of the solar panel 100. So, any dust that would have accumulated thereon would be cleaned by the oblong brush 120 during its sweeping travel towards the second secured position 128. By this time from the starting time, i.e. from 6:00 am till 6:00 pm, the solar panel 100 has turned by 180° and has covered the first semi-circular path.

Figure 8:
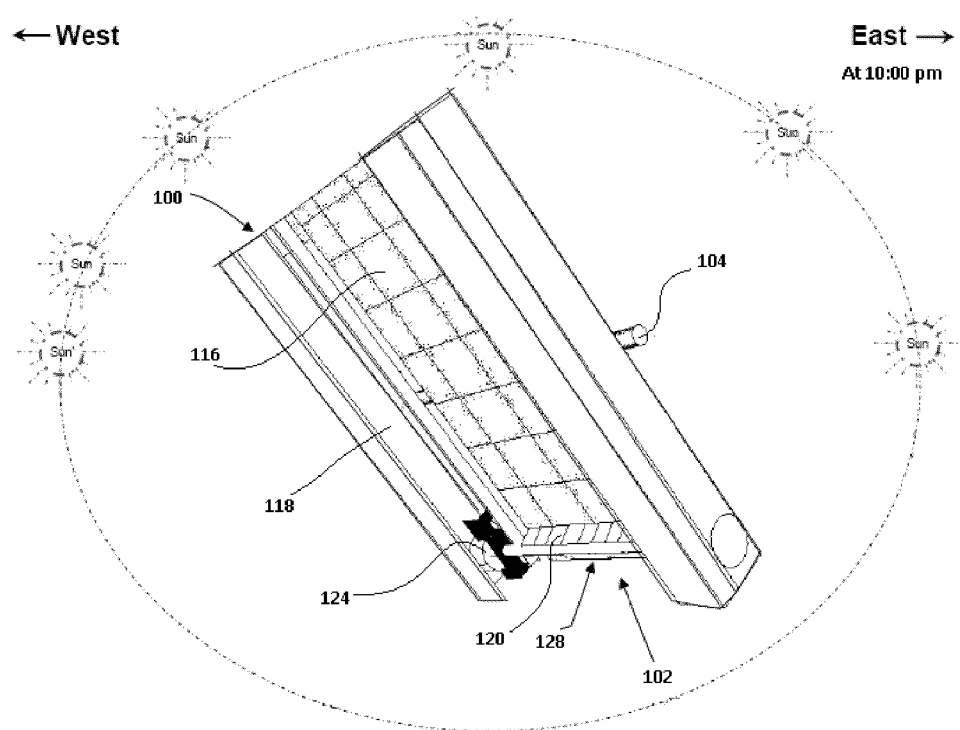
FIG. 8 shows position of the cleaning assembly on the solar panel of FIG. 7 and the position of the solar panel with respect to the sun at 10:00 am.
Figure 9:
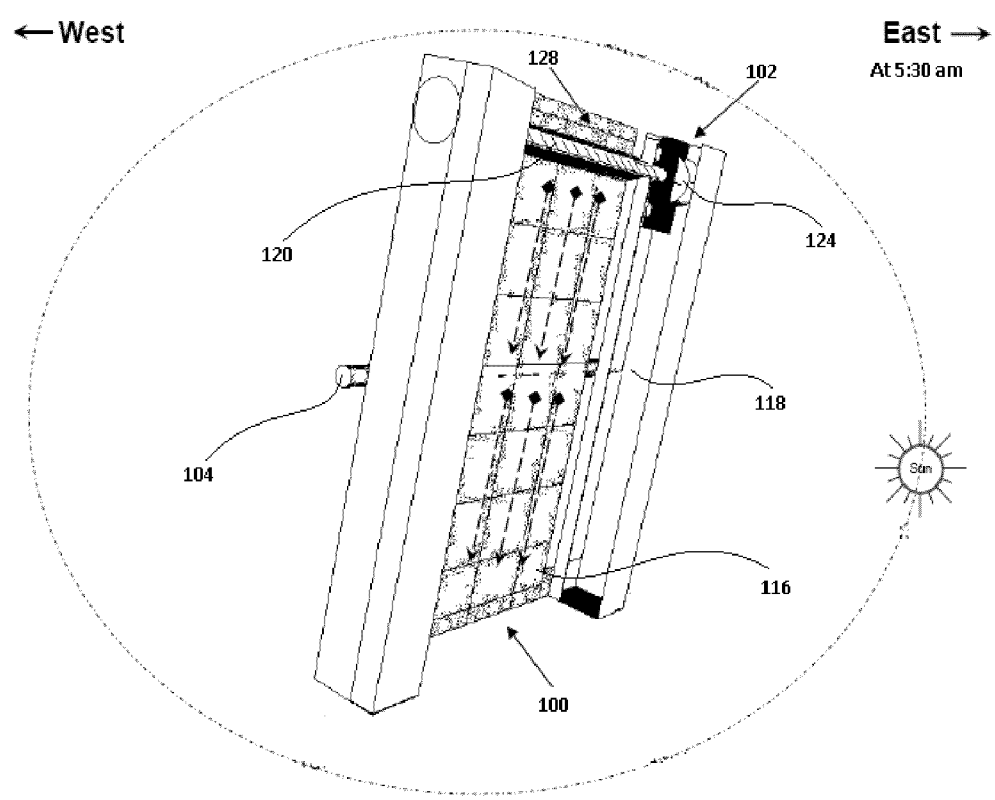
FIG. 9 shows position of the cleaning assembly on the solar panel of FIG. 8 and position of the solar panel with respect to sun and at 5:30 am.

FIG. 8 indicates the position of the solar panel 100 and the cleaning assembly 102 on the solar panel 100 at around 10:00 pm, at night. At this point of time at night, even if the sun rays are unavailable, the solar panel 100 still rotates simulating the axial rotation of the earth. Due to this further rotation of the solar panel 100, the solar energy exposed surface 116 of the solar panel 100 is turned upside down facing the supporting surface on which the solar panel 100 is mounted. The cleaning assembly 102 remains in the second secured position 128. The cleaning assembly 102 remains in the second secured position 128 till about 5:30 am as shown in FIG. 9. A further rotation of the solar panel 100 from its position as shown in FIG. 9 allows the cleaning assembly 102 to freely fall under the gravitational force from the second secured position 128 towards the first secured position 126.

The free fall of the cleaning assembly 102 towards the first secured position 126 allows the cleaning assembly 102 to again, for the second time, clean the solar energy exposed surface 116 of the solar panel 100. Thus, embodiments of the present invention allow the solar energy exposed surface 116 to be cleaned twice in 24 hours. Further rotation of the solar panel 100 allows the solar panel 100 to be oriented in a vertical orientation at around 6:00 am in the morning, as shown in FIG. 4, which is the starting position for the solar panel 100 to receive the sun rays for the subsequent day. By this time from the starting time, i.e. from 6:00 am of the previous day till 6:00 am of the subsequent day, the solar panel 100 has turned by 360° and has covered a full circular path.

According to another embodiment of the present invention, the stepper motor 108 may be stopped at around 6:00 pm once the solar panel 100 has covered a first semi-circular path and when the cleaning assembly 102 has reached to its second secured position 128. The user may then manually rotate the solar panel 100 back to the starting position, i.e., vertical orientation of the solar panel 100 at 6:00 am. Once the first sun rays are incident on the solar energy exposed surface 116 of the solar panel 100, the stepper motor 108 may be turned on to restart the rotation of the solar panel 100. By doing so, the solar energy exposed surface 116 of the solar panel 100 is also cleaned twice a day. It is to be understood that in all of the above embodiments, a cleaned solar energy exposed surface 116 is always presented to the sun so that the sun rays perpendicularly incident thereupon are fully utilized by the solar panel 100 to generate maximum electricity.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. An automated cleaning mechanism for a photovoltaic solar panel comprising:
   the solar panel having a flat solar energy exposed surface mounted for rotation about a horizontal axis along a circular path;
   a cleaning assembly, the solar panel being mounted for rotation about a horizontal axis along a semi-circular path and the cleaning assembly comprising an oblong brush held across the front face of the solar panel flat solar energy exposed surface and capable of being slidable back and forth along the flat solar energy exposed surface front face of the solar panel in a plane substantially perpendicular to the horizontal axis when the photovoltaic solar panel is rotated, the oblong brush positioned at one end of the flat solar energy exposed surface in a first secured position and slidable continuously to reach an opposite end thereof in a second secured position when the photovoltaic solar panel is rotated for a first half of the circular path, the oblong brush continuously slidable from the second secured position back to the first secured position when the flat solar energy exposed surface is rotated for the remaining half of the circular path.

2. The automated cleaning mechanism according to claim 1, wherein the solar panel includes a pair of opposite channels, the pair of opposite channels disposed on opposite lateral sides of the solar energy exposed surface.

3. The automated cleaning mechanism according to claim 2, wherein the cleaning assembly includes a pair of guide wheels disposed at opposite ends of the oblong brush and rotatably engaging a corresponding channel, the pair of guides wheels being acted upon by gravitational force in a vertical plane of the flat solar energy exposed surface so as to allow the oblong brush to slide along the flat solar energy exposed surface between the first and second secured positions.

4. The automated cleaning mechanism according to claim 1, wherein a central portion of the solar panel is rotatably mounted over a horizontal shaft rotatable about the horizontal axis the horizontal shaft when rotated allows the solar panel to rotate about the horizontal axis.

5. The automated cleaning mechanism according to claim 4, wherein the horizontal shaft is rotatably connected to an output shaft of a gear box, an input shaft of a speed reduction gear box being connected to a stepper motor.

* * * * *